United States Patent
Kim et al.

(10) Patent No.: US 9,852,339 B2
(45) Date of Patent: Dec. 26, 2017

(54) METHOD FOR RECOGNIZING IRIS AND ELECTRONIC DEVICE THEREOF

(71) Applicant: Samsung Electronics Co., Ltd., Gyeonggi-do (KR)

(72) Inventors: Moonsoo Kim, Seoul (KR); Boseul Jeon, Gyeonggi-do (KR); Youngeun Han, Gyeonggi-do (KR); Kwangsub Son, Gyeonggi-do (KR); Kihuk Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/929,243

(22) Filed: Oct. 30, 2015

(65) Prior Publication Data
US 2016/0125221 A1    May 5, 2016

(30) Foreign Application Priority Data
Oct. 31, 2014  (KR) .................. 10-2014-0149693

(51) Int. Cl.
| G06K 9/00 | (2006.01) |
| G06T 3/40 | (2006.01) |
| H04N 5/33 | (2006.01) |
| G06K 9/22 | (2006.01) |
| G06T 7/00 | (2017.01) |
| G06K 9/03 | (2006.01) |
| H04N 5/232 | (2006.01) |

(52) U.S. Cl.
CPC ....... *G06K 9/0061* (2013.01); *G06K 9/00604* (2013.01); *G06K 9/00912* (2013.01); *G06K 9/036* (2013.01); *G06K 9/22* (2013.01); *G06T 3/40* (2013.01); *G06T 7/0012* (2013.01); *H04N 5/23222* (2013.01); *H04N 5/33* (2013.01); *G06T 2207/10048* (2013.01); *G06T 2207/30041* (2013.01); *G06T 2207/30168* (2013.01)

(58) Field of Classification Search
CPC ........ G06K 9/0061; G06K 9/036; G06K 9/22; G06K 9/00912; G06K 9/00604; G06T 7/0012; G06T 3/40; G06T 2207/30041; G06T 2207/30168; G06T 2207/10048; H04N 5/33
USPC ....................................... 382/117
See application file for complete search history.

(56) References Cited

U.S. PATENT DOCUMENTS

| 6,483,930 | B1 * | 11/2002 | Musgrave | A01K 11/006 340/5.53 |
| 2008/0099678 | A1 * | 5/2008 | Johnson | G01J 5/02 250/332 |
| 2013/0259322 | A1 * | 10/2013 | Lin | G06K 9/0061 382/117 |
| 2014/0067679 | A1 * | 3/2014 | O'Reilly | G06F 21/32 705/44 |

* cited by examiner

*Primary Examiner* — Amandeep Saini

(57) ABSTRACT

An electronic device, according to various embodiments of the present disclosure, may include: an image sensor that obtains the first image; an image processing unit that processes the obtained first image to thereby create the second image; an image quality inspecting unit that performs image quality inspection on the basis of the created second image; and an iris recognition unit that, if the image quality of the second image satisfies a predetermined condition, performs iris recognition on the basis of the obtained first image.

20 Claims, 10 Drawing Sheets

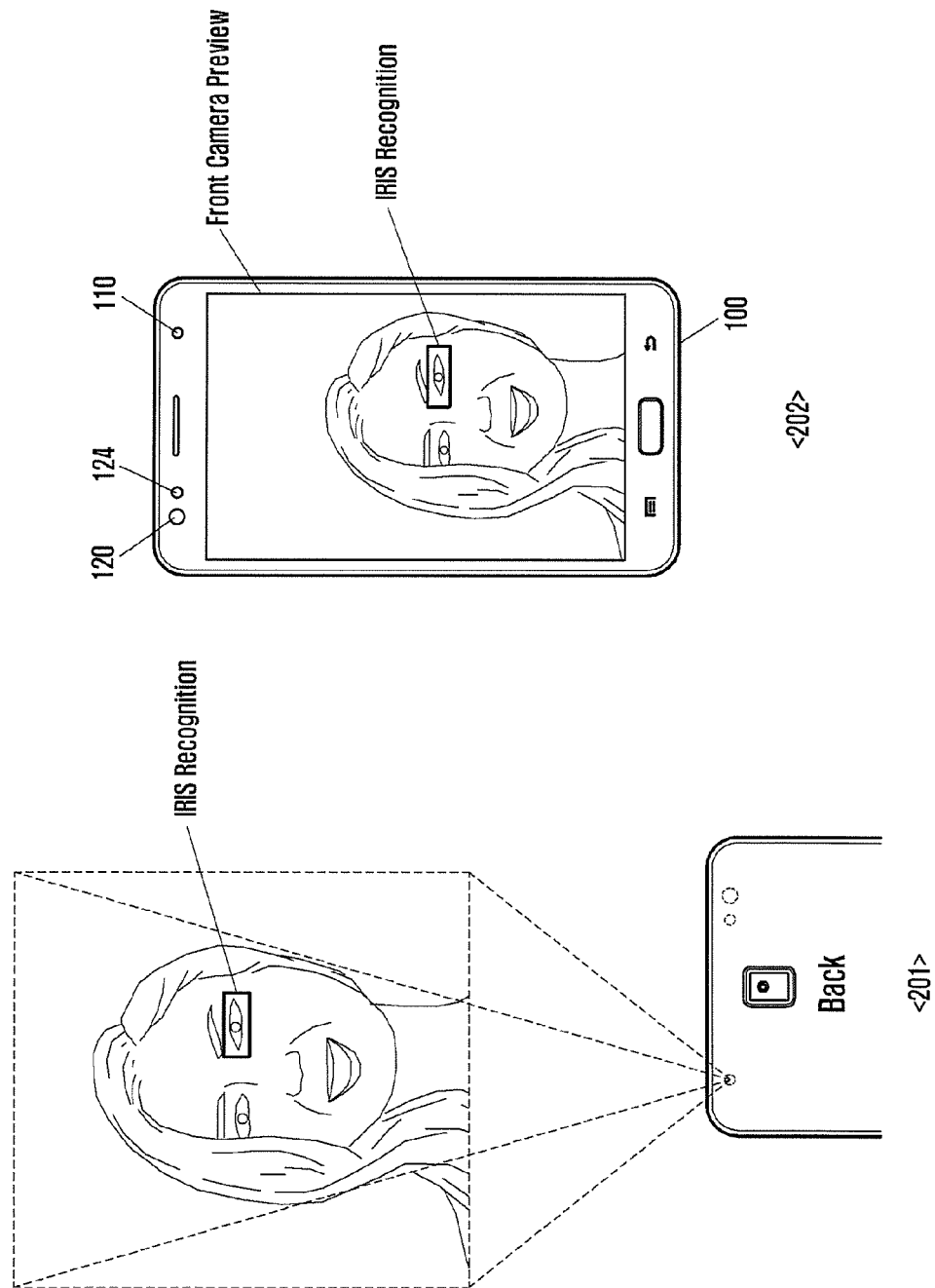

<210>

<220>

<510>

<520>

<530>

<540>

METHOD FOR RECOGNIZING IRIS AND ELECTRONIC DEVICE THEREOF

CROSS-REFERENCE TO RELATED APPLICATION AND CLAIM OF PRIORITY

The present application is related to and claims benefit under 35 U.S.C. §119(a) of Korean Patent Application No. 10-2014-0149693, filed on Oct. 31, 2014, which is hereby incorporated by reference for all purposes as if fully set forth herein.

TECHNICAL FIELD

Various embodiments of the present disclosure relate to a method for recognizing the iris using a camera module, and an electronic device thereof.

BACKGROUND

The iris is a human organ that transfers visual information, and can play the same role as the aperture of a camera. In addition, the iris is comprised of the most sophisticated and intricate fibrous tissue in the human body, and wrinkles or blood vessels in such a fibrous tissue can include intrinsic information in order to identify each individual.

An iris recognition system is one of the identity authentication methods using a live human body, and may retrieve the registered user information by analyzing the iris pattern. The iris recognition method may be used in order to improve security because the iris may be recognized only by a live user and identity theft is impossible.

SUMMARY

Conventional iris recognition systems obtain an image through an image sensor, and inspect the quality of the image to then perform the iris recognition. However, with the development of cameras, it takes a long time to inspect the quality of a high-resolution original image and to process the data thereof for the iris recognition. That is, in the case of inspecting the quality of a high-resolution image for each frame, the iris recognition cannot be performed in real time because it takes a long time for data processing.

In addition, even though the image quality inspection is conducted on the basis of a low-resolution image in order to reduce the data processing time, the image quality inspection is carried out after a delay. That is, there is a time gap between the obtaining of the low-resolution image and the inspecting of the image quality, so the image for the iris recognition can be obtained after the time gap. Therefore, the user cannot obtain the image for the iris recognition at a desired time due to the delay.

To address the above-discussed deficiencies, it is a primary object to provide an iris recognition method and an electronic device thereof that inspects the image quality on the basis of a low-resolution image to thereby perform the iris recognition in real time. In addition, the present disclosure provides an electronic device that processes the image in parallel to thereby obtain an image for the iris recognition at a desired time without a delay.

The present disclosure provides an electronic device that provides the user with guidance for the proper image quality inspection in inspecting the image quality.

In accordance with an aspect of the present disclosure, an electronic device may include: an image sensor that obtains the first image; an image processing unit that processes the obtained first image to thereby create the second image; an image quality inspecting unit that performs image quality inspection on the basis of the created second image; and an iris recognition unit that, if the image quality of the second image satisfies a predetermined condition, performs iris recognition on the basis of the obtained first image.

In accordance with another aspect of the present disclosure, a method for recognizing an iris in an electronic device may include: obtaining the first image through an image sensor; processing the obtained first image to thereby create the second image; performing image quality inspection on the basis of the created second image; and if the image quality of the second image satisfies a predetermined condition, performing iris recognition on the basis of the obtained first image.

The iris recognition method, according to the various embodiments of the present disclosure, may process the image obtained through the camera with a minimum resolution required for the image quality inspection, and may conduct the image quality inspection on the basis thereof so that the time for data processing can be reduced and the power consumption according thereto can be reduced as well.

The iris recognition method, according to the various embodiments of the present disclosure, may process a high-resolution image and a low-resolution image in parallel to thereby perform the iris recognition function without a delay. More specifically, the iris recognition method, according to the various embodiments of the present disclosure, may store a high-resolution image for the iris recognition in a buffer and may perform the image quality inspection on the basis of a low-resolution image, and if the low-resolution image passes the image quality inspection, may perform the iris recognition on the basis of the high-resolution image stored in the buffer so that the time gap required to inspect the image quality can be eliminated.

The iris recognition method, according to the various embodiments of the present disclosure, may provide the user with the guidance for the iris recognition to thereby quickly and easily perform the iris recognition. In addition, since the iris can be taken in an accurate focus through the guidance, the probability of a failure of the iris recognition process can be reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features, and advantages of the present disclosure will be more apparent from the following detailed description in conjunction with the accompanying drawings, in which: For a more complete understanding of the present disclosure and its advantages, reference is now made to the following description taken in conjunction with the accompanying drawings, in which like reference numerals represent like parts:

FIG. 2A illustrates an iris recognition method using an electronic device, according to various embodiments of the present disclosure;

DETAILED DESCRIPTION

Figure 1:
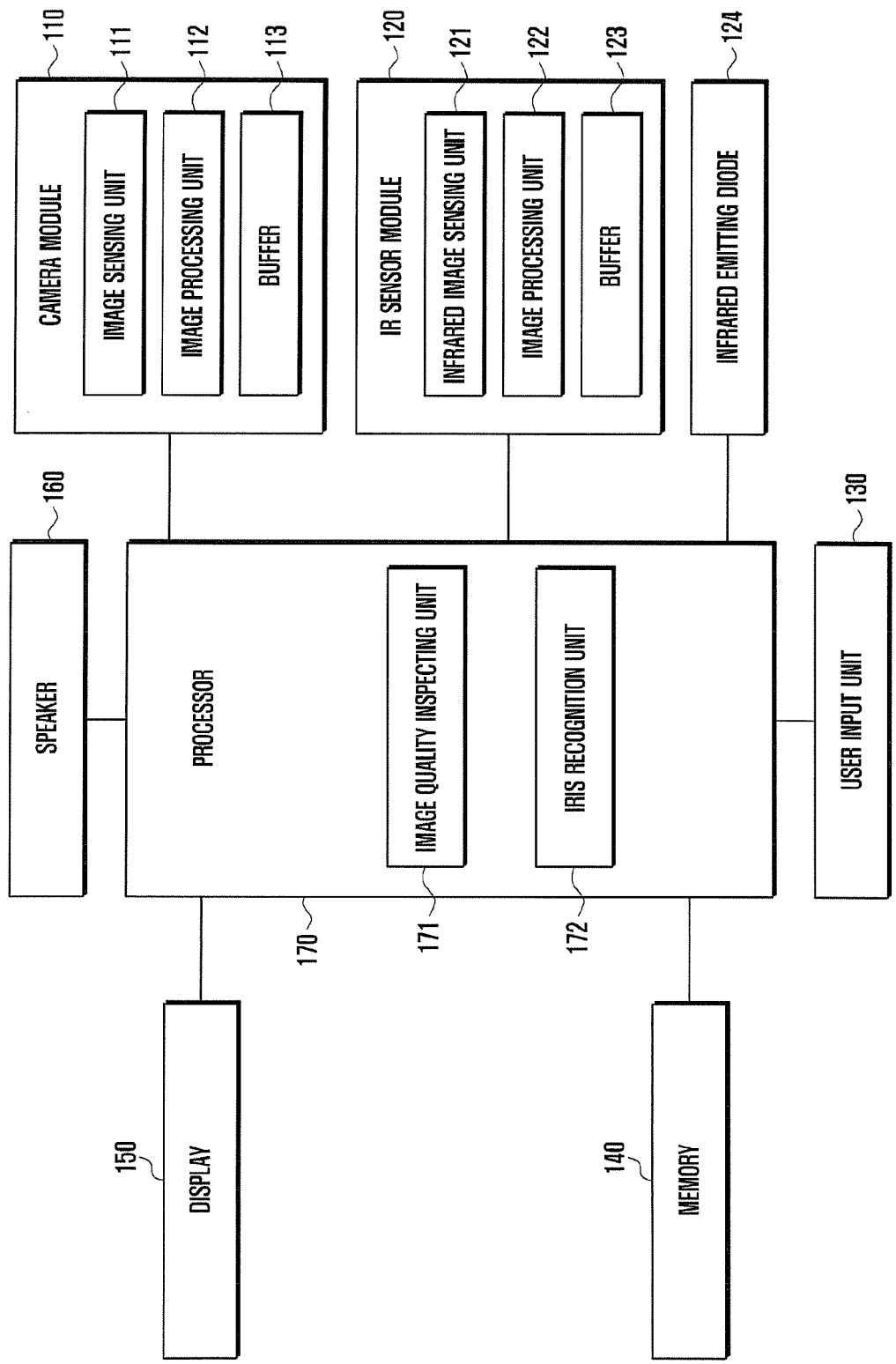
FIG. 1 is a block diagram of an electronic device, according to various embodiments of the present disclosure.

FIGS. 1 through 5C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged image processing technologies.

Hereinafter, various embodiments of the present disclosure will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

FIG. 1 is a block diagram of an electronic device, according to various embodiments of the present disclosure.

The electronic device 100 may include a camera module 110, an IR sensor module 120, an infrared emitting diode (IRED) 124, a user input unit 130, a memory 140, a display 150, a speaker 160, and a processor 170.

The camera module 110 may photograph still images and moving images, and may include an image sensing unit 111, an image processing unit 112, and a buffer 113. The image sensing unit 111 may include a CMOS (complementary metal oxide semiconductor) sensor, or a CCD (charge-couple device) sensor. The image sensing unit 111 may create an image for the iris recognition (hereinafter, referred to as the first image). The first image may be a raw image that has information only on the intensity of light detected by a photographing medium. The first image may be a full-size image sensed by the image sensing unit 111. The image sensing unit 111 may photograph an object at a predetermined time interval to thereby obtain a plurality of the first images having a time interval.

The image processing unit 112 may process the first image obtained from the image sensing unit 111 to thereby create an image for the image quality inspection (hereinafter, referred to as the second image). More specifically, in the method for creating the second image, the image processing unit 112 may perform a function of image-scaling the first image output from the image sensing unit 111. The image-scaling function refers to adjusting the image to a pre-set size or a pre-set resolution. According to various embodiments of the present disclosure, the image-scaling can be achieved by resizing. The resizing may be performed in a method of decimating, interpolating, or cropping the image in order to thereby adjust the size of the image. Decimating is a method of reducing the number of rows or columns of the obtained image at a specific ratio. Interpolating is a method of analyzing an existing pixel value to calculate a new pixel value when changing the size of the image. Cropping is a method of extracting a specific portion from a full frame of the image according to a ratio. According to various embodiments of the present disclosure, the image-scaling may be implemented in an adding and averaging method. The adding and averaging method refers to a method of creating adjacent pixels as a single pixel to thereby adjust the number of pixels.

According to various embodiments of the present disclosure, the image processing unit 112 may reduce the number of pixels of the first image to thereby scale the first image to a proper size to be displayed on the display 150, and may scale the first image to conform to the screen ratio of the display 150. According to various embodiments of the present disclosure, the first image may be scaled in various ratios. For example, provided that the scaling ratio is 4:1, the image processing unit 112 may down-scale the first image of 8 Mbytes that is received to thereby create the second image of 2 Mbytes.

The buffer 113 may store the first image output from the image sensing unit 111. If the image quality inspecting unit 171 determines that the quality of the second image satisfies a predetermined condition, the buffer 113 may output the first image to the iris recognition unit 172. The first image may be an image that is related to the second image that has passed the image quality inspection, among a plurality of images stored in the buffer 113. The buffer 113 may store a pre-set number of images. For example, the buffer 113 may have N ring buffer structures capable of storing image data of N frames. In this case, the buffer 113 may store the first images output from the image sensing unit 111 in the first buffer to the last buffer in sequence, and if the image data is stored in the last buffer, the image data may be overwritten on the first buffer. According to various embodiments of the present disclosure, if the value of N is 5, the ring buffer of the buffer 113 may have a structure for storing the image data of 5 frames.

The IR sensor module 120 is a device that is able to photograph an object using an infrared ray, and may be referred to as an infrared camera. The IR sensor module 120 may include an infrared image sensing unit 121, an image processing unit 122, and a buffer 123. The infrared image sensing unit 121, according to various embodiments of the present disclosure, may be comprised of a normal image sensor (e.g., the image sensing unit 111 of the camera module 110), a band pass filter, and a lens. The operation of the infrared image sensing unit 121 will be described in detail later with reference to FIG. 2B and FIG. 2C. The infrared image sensing unit 121 may detect a photographed image to thereby convert the same into an electrical signal. The infrared image sensing unit 121 may create an image for the iris recognition (hereinafter, referred to as the first image). The first image may be a raw image that has only information on the intensity of the light detected by a photographing medium. The first image may be a full-size image sensed by the infrared image sensing unit 121. The infrared image sensing unit 121 may photograph an object at a predetermined time interval to thereby obtain a plurality of the first images having a time interval.

The image processing unit 122 may process the first image obtained from the infrared image sensing unit 121 to thereby create an image for the image quality inspection (hereinafter, referred to as the second image). More specifically, in the method for creating the second image, the image processing unit 122 may perform a function of image-scaling the first image output from the infrared image sensing unit 121. The image-scaling function may be performed in the same manner as the image processing unit 112 of the above-mentioned camera module 120.

The buffer 123 may operate in the same manner as the buffer 113 of the above-mentioned camera module 110. In other words, the buffer 123 may store the first image output from the infrared image sensing unit 121.

The infrared emitting diode 124 may emit the light in a specific wavelength band. For example, the infrared emitting diode 124 may emit the light having a wavelength of 800 nm to 900 nm. The IR sensor module 120 may include a band pass filter that is designed to have a wavelength band corresponding to at least a portion of a particular wavelength band emitted through the infrared emitting diode. This is for preventing a malfunction that may be caused by the ambient light of the other infrared wavelength band. The infrared emitting diode 124 may be synchronized with an input frame of the infrared image sensing unit 121 to thereby emit a pulse wave light, or a continuous wave light. According to various embodiments of the present disclosure, the electronic device 100 may include at least one of the camera module 110, or the IR sensor module 120, and the iris recognition may be conducted only by one of them.

The user input unit 130 may be comprised of buttons that create instructions for performing the configuration and operation of the functions of the camera device. The user input unit 130 may be configured as a touch panel, and the touch panel, for example, may detect a touch input by at least one of a capacitive type, a pressure-sensitive type, an infrared type, or an ultrasonic type. According to various embodiments of the present disclosure, the user may input a touch input for entering the iris recognition mode into the touch panel.

The memory 140 may store the images photographed by the camera device, and may store image files or video files. In addition, the memory 140 may pre-store authenticated iris feature information for the iris recognition.

The display 150 may display various pieces of information (e.g., multimedia data, text data, or the like) to the user. The display 150 may include a panel, a hologram device, or a projector. The Panel, for example, may be an LCD (liquid-crystal display), or an AM-OLED (active-matrix organic light-emitting diode). The panel, for example, may be implemented to be flexible, transparent, or wearable. The panel may be combined with the touch panel as a single module. The hologram device may show a three-dimensional image in the air by using the interference of light. The projector may project a light onto a screen to display an image. The screen, for example, may be provided inside or outside the electronic device 100. According to various embodiments of the present disclosure, the display 150 may display the created second image. In addition, if the quality of the second image does not satisfy a predetermined condition, the display 150 may display the guidance in order to satisfy the predetermined condition.

The speaker 160 may convert an electrical signal into a sound. If the quality of the second image does not satisfy the predetermined condition, the speaker 160 may output audio information on the guidance in order to satisfy the predetermined condition.

The processor 170 may include an image quality inspecting unit 171 and an iris recognition unit 172. The processor 170, for example, may receive instructions from the other elements (e.g., the camera module 110, the IR sensor module 120, the user input unit 130, the memory 140, the display 150, or the like) mentioned above, and may decode the received instructions to thereby perform the calculation or data processing based on the decoded instructions.

The image quality inspecting unit 171 may receive the second image, and may analyze the received second image in order to thereby inspect the quality of the second image. The items of the image quality inspection may include at least one of the focal accuracy, the degree of image blur, the brightness, the presence of a face, or the presence of an iris of the second image. More specifically, the image quality inspecting unit 171 may pre-configure focus information, blur information, or brightness information of the image that is suitable for the iris recognition. When the second image is input into the image quality inspecting unit 171, the image quality inspecting unit 171 may calculate the focal accuracy of the second image to thereby compare the same with the predetermined focus information. If the focal accuracy of the second image is not sufficient enough to recognize the user's face or iris, the image quality inspecting unit 171 may determine that the corresponding image is an inappropriate image for the iris recognition. The image quality inspecting unit 171 may calculate the degree of image blur on the basis of the edge information on the face shown in the second image or the edge information on the iris shown in the second image. The image quality inspecting unit 171 may compare the calculated degree of image blur with a predetermined degree of image blur, and if it is not enough to recognize the user's face or iris in the second image, the image quality inspecting unit 171 may determine that the corresponding image is an inappropriate image for the iris recognition. The image quality inspecting unit 171 may calculate the brightness of the second image, and may compare the same with the predetermined brightness information. In other words, the image quality inspecting unit 171 may determine whether or not the brightness of the second image is enough to obtain the edge information on the face or the edge information on the iris for the iris recognition. If it is not possible to obtain the edge information on the face or the edge information on the iris for the iris recognition because the brightness of the second image is too low or too high, the image quality inspecting unit 171 may determine that the corresponding image is an inappropriate image for the iris recognition. The image quality inspecting unit 171 may configure the face area or the iris area included in the second image to be the area of interest, by using the edge information on the face or the edge information on the iris of the second image. The image quality inspecting unit 171 may extract the iris feature information from the configured area of interest, and may output the same to the iris recognition unit 172. If it is impossible to obtain the edge information on the face or the edge information on the iris because it does not exist in the second image, the image quality inspecting unit 171 may determine that the corresponding image is an inappropriate image for the iris recognition. If it is determined that the corresponding image is an inappropriate image for the iris recognition, the image quality inspecting unit 171 may provide the guidance in order to obtain an image suitable for the iris recognition. More information on the guidance will be provided later in FIG. 5.

The iris recognition unit 172 may receive the first image stored in the buffer, and may analyze the received first image to thereby extract the iris feature information. The iris feature information may include wrinkles formed in the iris, a blood vessel pattern, or a color thereof, and may further include a changing pattern of the features according to the size of a pupil that varies depending on the outer brightness. The iris feature information may further include other information that is commercially available. In addition, the iris recognition unit 172 may compare the iris feature information analyzed from the user who is currently approaching the same with the authenticated iris feature information that has been obtained from the user who is pre-registered (authenticated) and stored. If it is determined that the iris feature information analyzed from the currently approaching user matches one piece of the pre-stored and authenticated iris feature information to an extent more than a predetermined value, the iris recognition unit 172 may determine that the currently approaching user is the authenticated user. On the contrary, if it is determined that the iris feature information analyzed from the currently approaching user does not match one piece of the pre-stored and authenticated iris feature information to an extent more than a predetermined value, the iris recognition unit 172 may determine that the currently approaching user is not the authenticated user.

FIG. 2A illustrates an iris recognition method using the electronic device 100, according to various embodiments of the present disclosure.

In diagram 201, when the user enters an iris recognition mode through the user input unit 130, the electronic device 100 may photograph the user using at least one of the camera module 110 or the IR sensor module 120. In the case of conducting the iris recognition through the IR sensor module 120, the electronic device 100 may use the infrared emitting diode (IRED) 124. The electronic device 100 may obtain the first image through the image sensing unit 111 included in the camera module 110. The first image may be a full-size image sensed by the image sensing unit 111. The obtained first image may be stored in the buffer 113, and may be input into the image processing unit 112 to be processed. The image processing unit 112 may process the first image to thereby create the second image. The image processing may be performed in such a manner as to scale the image. The image quality inspecting unit 171 may receive the second image from the image processing unit 112 to then inspect the quality of the second image. The items of the image quality inspection may include at least one of the focal accuracy, the degree of image blur, the brightness, the presence of a face, or the presence of an iris of the second image. If the quality of the second image fails to satisfy a predetermined condition, the image quality inspecting unit 171 can provide the user with the guidance in order to meet the predetermined condition. If the quality of the second image satisfies the predetermined condition, the iris recognition unit 172 can receive the stored first image from the buffer 113 to thereby conduct the iris recognition.

In diagram 202, the electronic device 100, according to various embodiments of the present disclosure, can perform the iris recognition using the image sensing unit 111 of the camera that is functionally connected to the electronic device 100. In one embodiment, a front camera 110 can include a low-resolution image sensor and a lens that has a small viewing angle. If the image sensing unit 111 supports a low-resolution image, the lens can be designed to have a small viewing angle in order to secure a sufficient number of pixels required for the iris recognition. For example, if the image sensing unit 111 supports the resolution of VGA (640×480) and if the number of pixels in the iris area requires the pixels of 200×200 for the iris recognition, the lens can be designed as a telephoto lens so that the iris can be recognized at a reasonable distance even though the user does not put his or her eyes close to the camera. The electronic device 100 can perform the iris recognition using the image obtained through the image sensing unit 111.

According to another embodiment of the present disclosure, the front camera 110 can include a high-resolution image sensing unit 111 and a wide-angle lens. In the case of the high-resolution image sensing unit 111, the wide-angle lens can obtain more images, and the iris can be recognized even though the user does not make a close approach to the camera that is functionally connected with the electronic device 100. For example, if the image sensing unit 111 supports the resolution of FHD (1920×1080) and if the number of pixels in the iris area requires the pixels of 200×200 for the iris recognition, since the number of pixels in the iris area is relatively small compared to the resolution, the lens can be designed to have a wide viewing angle to thereby increase the degree of freedom for the iris recognition depending on the position of the user's face. The electronic device 100 can perform the iris recognition using the image obtained through the image sensing unit 111. The electronic device 100 can inspect the quality of the iris image for the iris recognition, and at the same time can display a preview image obtained through the front camera 110 on the display 150.

Figure 2B:
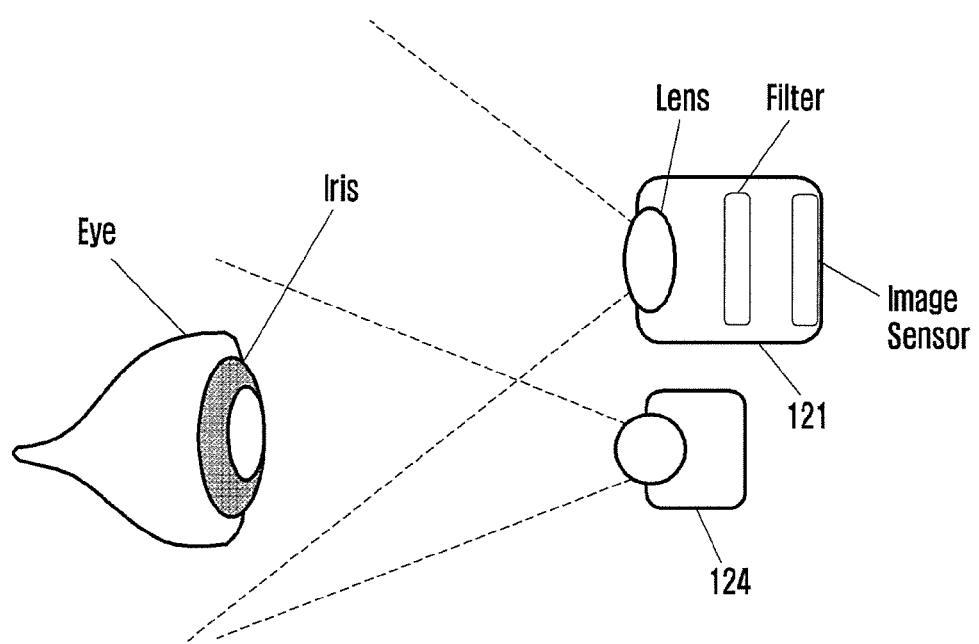
FIG. 2B illustrates an operation in which an electronic device obtains an iris image through an infrared image sensing unit, according to various embodiments of the present disclosure.

FIG. 2B illustrates an operation in which the electronic device 100 obtains the iris image through the infrared image sensing unit 121, according to various embodiments of the present disclosure.

Figure 2C:
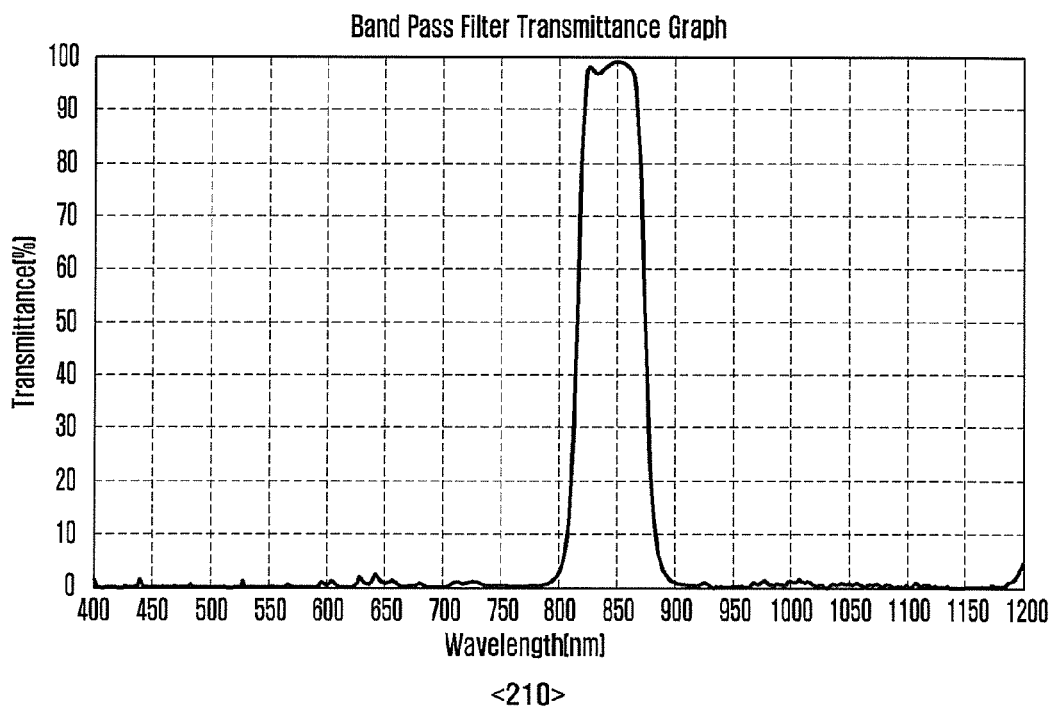
FIG. 2C is a graph showing a range of wavelengths that pass through a band pass filter of an infrared image sensing unit, and the range of the wavelengths that emit in an infrared emitting diode, according to various embodiments of the present disclosure.
Figure 2C:
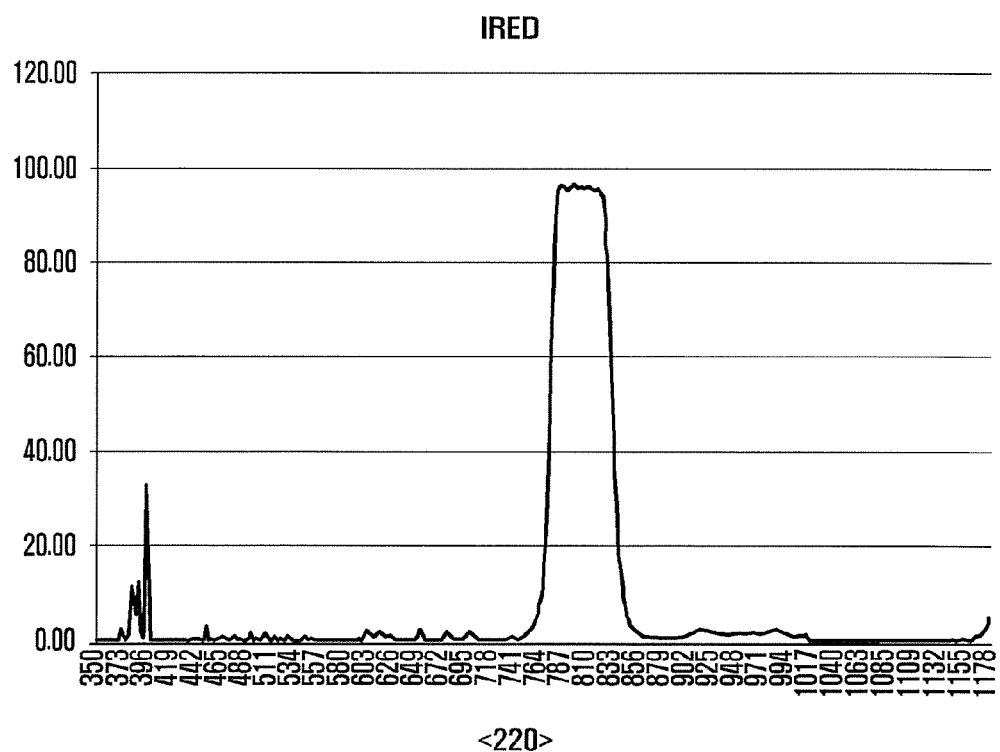

FIG. 2C is a graph showing the range of the wavelengths that pass through the band pass filter of the infrared image sensing unit 121, and the range of the wavelengths that emit from the infrared emitting diode 124, according to various embodiments of the present disclosure.

Referring to FIGS. 2B and 2C, the infrared image sensing unit 121, according to various embodiments of the present disclosure, can include an image sensor, a band pass filter, and a lens. The electronic device 100 can include an infrared emitting diode 124, and an LED driver.

The infrared emitting diode 124 can emit a light in a specific wavelength band according to the control of the LED driver. The electronic device 100 can use the infrared emitting diode 124 capable of emitting a continuous wave light, or the infrared emitting diode 124 capable of emitting a pulse light in synchronization with the input frame of the image sensor. The LED driver included in the electronic device 100 can drive the infrared emitting diode according to control of the IR sensor module 120. The lens can accept the light for an input of the user's iris, and the light incident on the lens can reach the band pass filter. The band pass filter is disposed behind the lens in order to pass the light having a specific wavelength band among the incident light. The band pass filter can correspond to a wavelength band including at least a portion of the wavelength band emitted from the infrared emitting diode 124. For example, an optical signal having a wavelength of the specific band, which has passed through the band pass filter, can reach the image sensor.

The infrared emitting diode 124 included in the electronic device 100 can emit an infrared ray of a specific wavelength band, and the IR sensor module 120 can accept a reflected light of the infrared ray of the specific wavelength band. At this time, the IR sensor module 120 can include a band pass filter that has a wavelength band including at least a portion of the specific wavelength band emitted from the infrared emitting diode 124. The IR sensor module 120 can accept only the light having a specific wavelength band to thereby convert the same into a digital signal. The band pass filter can accept only the light that has a specific frequency as shown in diagram 210 of FIG. 2C. For example, referring to diagram 220 of FIG. 2C, if the infrared emitting diode 124 emits a light in the wavelength band of 800 nm to 900 nm, the band pass filter passes the light in the wavelength band of 800 nm to 900 nm including a central wavelength (850 nm) of the infrared ray emitted from the infrared emitting diode 124 in order to thereby selectively accept the light emitted from the infrared emitting diode 124 depending on the wavelength band. This can prevent a malfunction caused by the light of another infrared wavelength band.

Figure 3A:
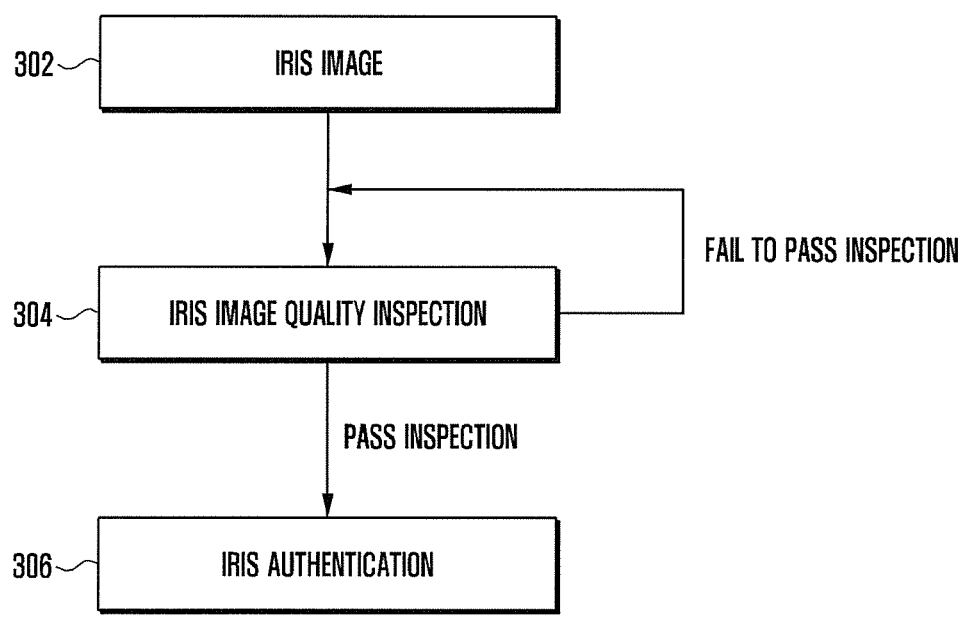
FIG. 3A illustrates an operation in which an electronic device inspects the quality of an iris image, according to various embodiments of the present disclosure.

FIG. 3A illustrates the operation in which the electronic device 100 inspects the quality of the iris image, according to various embodiments of the present disclosure.

According to various embodiments of the present disclosure, the image sensor 110 or the infrared image sensor 120 can accept the image including the iris area of the user in operation 302. The image quality inspecting unit 171 can perform the quality inspection of the iris image 310 using the received image in operation 304. Since the iris image quality inspection is conducted before the iris is recognized, a delay due to unnecessary recognition can be prevented and the power consumption according thereto can be reduced. The items of the image quality inspection can include at least one of the degree of image blur, the focal accuracy, the brightness, the presence of a face, or the presence of an iris of the second image. For example, if an obtained image is blurred because of a user's hand tremor, the degree of image blur of the image can be identified in the quality inspection process by using the edge information or a gyro sensor that is functionally connected with the electronic device 100. If the blur of the image is identified, the electronic device 100 can inspect the quality of the image that is input in the next frame without performing the iris recognition.

According to various embodiments of the present disclosure, in the case where the camera module 110 or the IR sensor module 120 is an FF (Fixed Focus) camera module, most cameras can be set to have a focus of 40 cm that corresponds to the user's arm length. The electronic device 100 can determine whether or not the depth of the focused area includes the iris area by determining the resolution of the user's face in the image. In addition, according to another embodiment, the electronic device 100 can determine whether or not the image has a face, an iris, or a proper brightness through the analysis of the image. The electronic device can determine whether or not to perform the iris recognition at operation 306 according to the result of the determination.

Figure 3B:
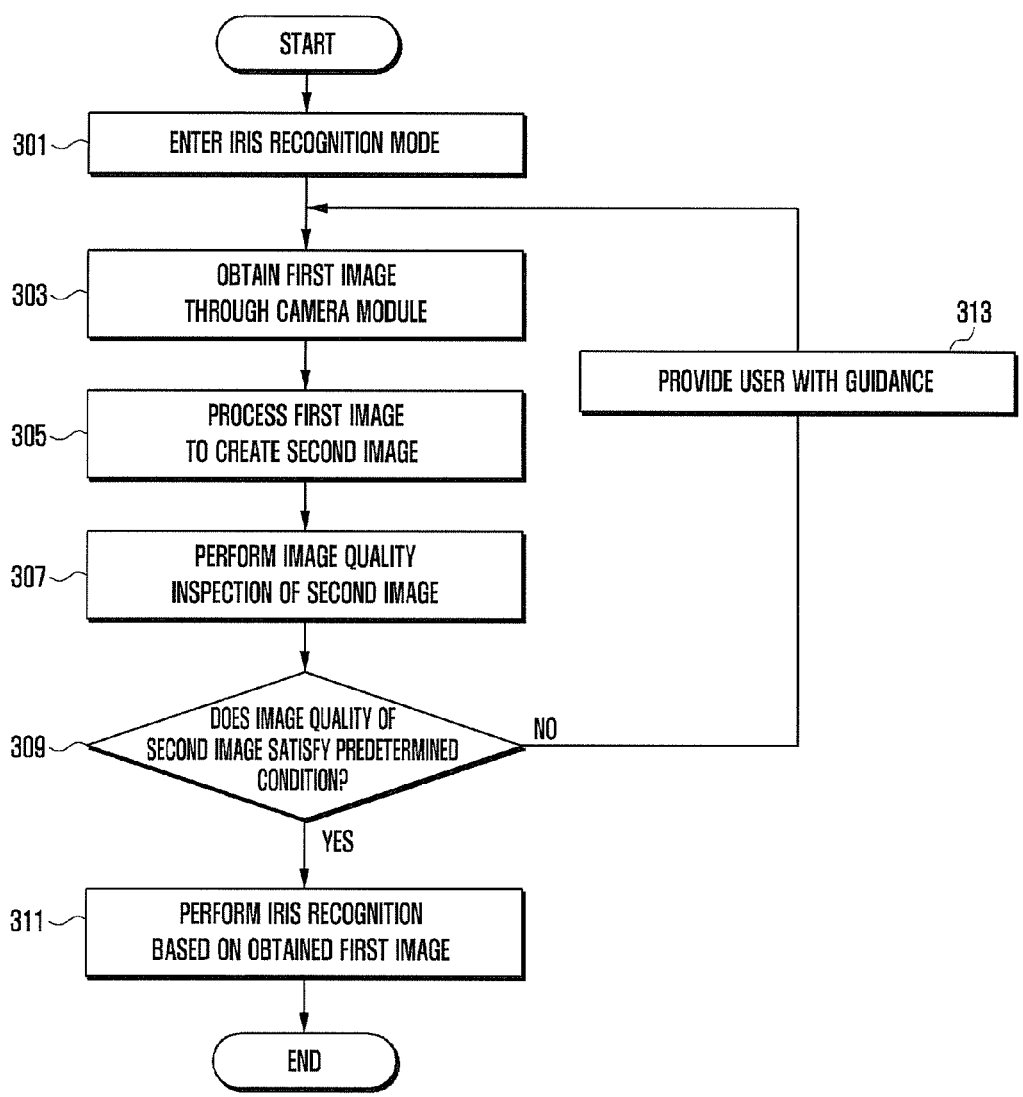
FIG. 3B is a flowchart illustrating an iris recognition operation of an electronic device, according to various embodiments of the present disclosure.

FIG. 3B is a flowchart illustrating the iris recognition operation of the electronic device 100, according to various embodiments of the present disclosure.

In operating 301, the electronic device 100 can enter the iris recognition mode. The electronic device 100 can receive a specific input, such as a touch input, from the user to thereby enter the iris recognition mode.

The electronic device 100 can enter the iris recognition mode to thereby obtain the first image using at least one of the camera module 110 and the IR sensor module 120 in operating 303. The electronic device 100 can obtain the first image through the image sensing unit 111 included in the camera module 110. The first image can be a full-size image sensed by the image sensing unit 111. The electronic device 100 can input and store the obtained first image in the buffer.

In operating 305, the electronic device 100 can process the first image that is obtained through the image sensing unit 111 to thereby create the second image. More specifically, the image processing can include the image-scaling. According to various embodiments of the present disclosure, the image-scaling can be achieved by adjusting the size of the image using a resizing method, or adjusting the number of pixels of the image using an adding-and-averaging method. The image processing unit 112 included in the camera module 110 can reduce the number of pixels of the first image to thereby scale the first image to a proper size to be displayed on the display 150, and can scale the first image to conform to the screen ratio of the display 150. According to various embodiments of the present disclosure, the image-scaling can be conducted in various ratios.

In operating 307, the electronic device 100 can conduct the quality inspection of the created second image. The items of the image quality inspection can include at least one of the focal accuracy, the degree of image blur, the brightness, the presence of a face, or the presence of an iris of the second image. In the case where the image sensing unit 111 obtains the first image of a high-resolution, according to the prior art, the image quality inspection and the iris recognition cannot be performed in real time because it takes a long time for the image quality inspection. According to various embodiments of the present disclosure, the image sensing unit 111 can simultaneously output the second image of a low-resolution for providing a preview or inspecting the image quality, as well as the first full-size image for the iris recognition while photographing the object. The first image, which is continuously photographed at a predetermined time interval, can be temporarily stored in the buffer included in the electronic device 100, and can continue to be updated based on a plurality of frames. The second image created using the first image is used for the quality inspection and the preview, and if the second image of a certain frame among the second images of a plurality of frames passes the image quality inspection, the electronic device 100 can conduct the iris recognition using the first image (the first image is associated with the second image that passes the image quality inspection) stored in the buffer.

For example, electronic device 100 can obtain the first image of 8 megapixels by photographing an object in 8 megapixels. The electronic device 100 can process the obtained first image to create the second image (1280×720). The electronic device 100 can perform the quality inspection or provide the preview using the second image of HD (1280×720). At this time, the first image of 8 megapixels can continue to be updated and can be stored in the ring buffer, and the second image (the HD image) can be used for the quality inspection or the preview. The electronic device 100 can perform the rapid image quality inspection for each frame of the HD image, and if the second image frame passes the image quality inspection, the electronic device 100 can retrieve the first image frame of 8 megapixels associated with the corresponding second image frame in order to thereby perform the iris recognition.

That is, since the electronic device performs the image quality inspection on the basis of the second image of a low resolution, it takes less time for the image quality inspection so that the electronic device can determine whether or not the first image is suitable for the iris recognition in real time. The electronic device 100 can perform the image quality inspection using the edge information or the gyro sensor that is functionally connected with the electronic device 100. For example, the electronic device can determine the degree of image blur on the face line or the iris line by using the edge information on the boundary lines, and can determine the degree of defocus caused by a hand tremor by using the gyro sensor. According to various embodiments of the present disclosure, in the case where the camera module of the electronic device 100 is an FF (Fixed Focus) module, most cameras can be set to have a focus of 40 cm that corresponds to the user's arm length. In addition, the electronic device can calculate the resolution of the user's face in the image to thereby determine whether or not the depth of the focused area includes the iris area. According to various embodiments of the present disclosure, in the case of using the IR sensor module 120, if the user's eyes are not detected, the electronic device can operate in a state in which the amount of the infrared ray is reduced. On the contrary, if the user's eyes are detected, the amount of the infrared ray can be increased. According to this, the power consumption due to the continuous light-emission can be reduced, and the amount of the infrared light incident on the eyes for a unit time can be minimized to thereby secure the eye safety.

In operation 309, the electronic device 100 can determine whether or not the image quality of the second image satisfies a predetermined condition. For example, the electronic device 100 can determine whether or not the focus of the second image satisfies the predetermined condition. The electronic device 100 can determine whether or not the degree of image blur of the second image satisfies the predetermined condition. The electronic device 100 can determine whether or not the brightness of the second image satisfies the predetermined condition. The electronic device 100 can determine whether or not a face exists in the second image. The electronic device 100 can determine whether or not an iris exists in the second image.

If the quality of the second image satisfies the predetermined condition, in operation 311, the electronic device 100 can perform the iris recognition on the basis of the first image obtained from the image sensing unit 111. More specifically, the electronic device 100 can perform the iris recognition on the basis of the first image related to the second image that satisfies the predetermined condition. The first image related to the second image can be a raw image of a full size prior to processing the second image.

If the image quality of the second image does not satisfy the predetermined condition, in operation 313, the electronic device 100 can provide the user with the guidance in order to satisfy the predetermined condition. For example, if the focus of the second image does not satisfy the predetermined condition, the electronic device 100 can display the text information "Please let your eyes focus on the camera" or an arrow sign for the accurate focus on the display 150, or can output the audio information thereof through the speaker 160. In addition, if the brightness of the second image does not satisfy the predetermined condition, the electronic device 100 can display the text information "Please adjust the brightness up," or "Please adjust the brightness down" on the display 150, or can output the audio information thereof through the speaker 160. In addition, if the blur of the second image does not satisfy the predetermined condition, the electronic device 100 can display the text information "Image is quite blurred. Please remain motionless for photographing" on the display 150, or can output the audio information thereof through the speaker 160. If a face or an iris of the user does not exist in the second image, the electronic device 100 can display the text information "No face is found," or "No iris is found" on the display 150, or can output the audio information thereof through the speaker 160.

According to various embodiments of the present disclosure, if the image quality of the second image does not satisfy the predetermined condition, the electronic device 100 can perform the image quality inspection on the basis of the second image of the next frame. For example, the electronic device 100 can photograph the iris images at a predetermined time interval in order to thereby obtain at least one of the first image frames, and can inspect the quality of at least one of the second image frames related to the first image frames. If the image quality of the second image frame does not satisfy the predetermined condition at a specific time, the electronic device 100 can inspect the quality of the second image of the next frame.

Figure 4:
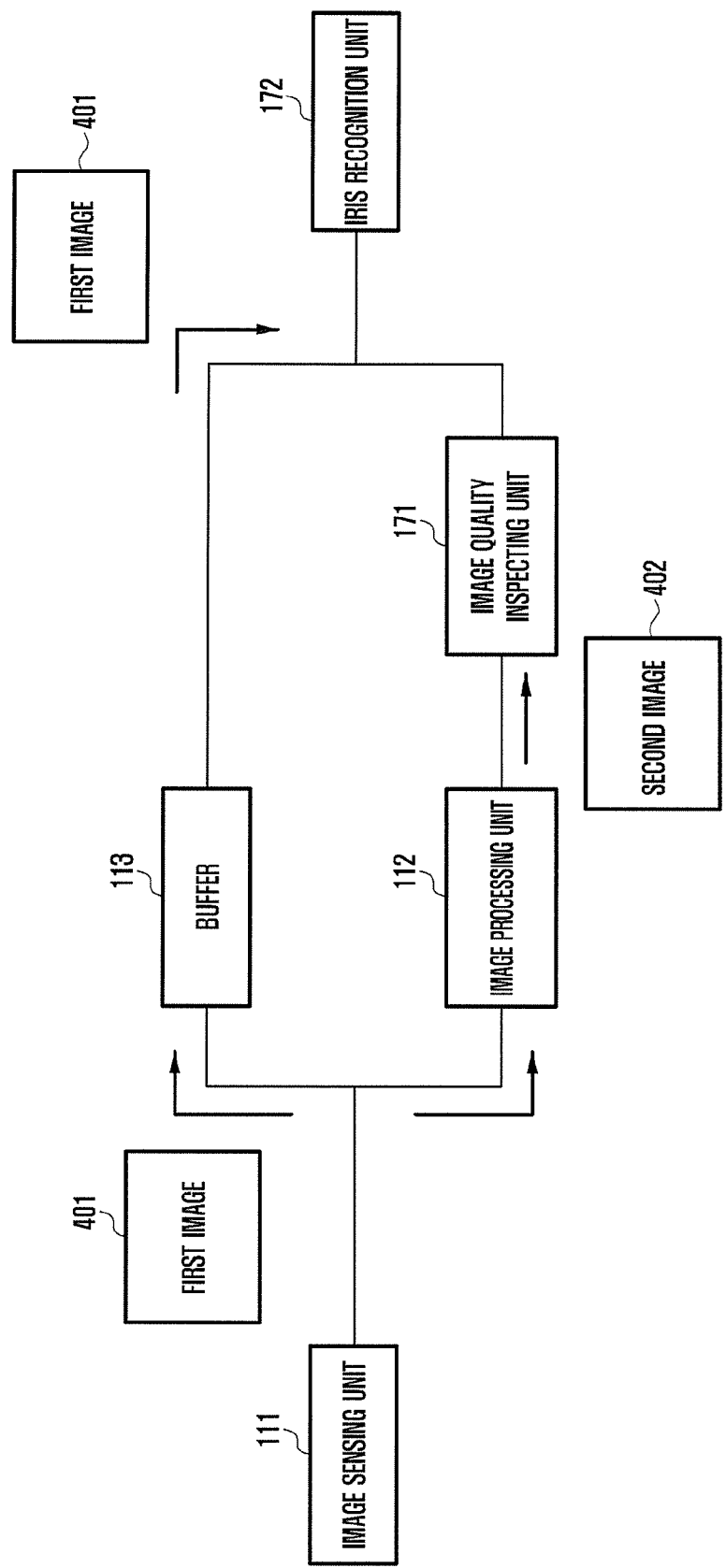
FIG. 4 illustrates an iris recognition operation of an electronic device, according to various embodiments of the present disclosure.

FIG. 4 illustrates the iris recognition operation of the electronic device 100, according to various embodiments of the present disclosure.

The electronic device 100 can obtain the first image 401 through at least one of the image sensing unit 111 included in the camera module 110, or the infrared image sensing unit 121 included in the IR sensor module. The obtained first image 401 can be input and stored in the buffer 113, and can be input into the image processing unit 112 to be processed as well. The buffer 113 can be set as N frames, and if N is 5, the buffer 113 can store the first images of five frames, which are photographed at a regular time interval. The image processing unit 113 can process the first image received from the image sensing unit 111 to thereby create the second image 402. The image processing can include the image-scaling. The image-scaling can include the above-mentioned image-scaling methods.

The second image 402 created in the image processing unit 112 can be displayed on the display 150 to be thereby provided to the user. The second image 402 created in the image processing unit 112 can be input into the image quality inspecting unit 171 in order to thereby determine whether or not the quality of the second image 402 is suitable for the iris recognition. The image quality inspecting unit 171 can determine whether or not the image quality of the second image 402 satisfies a predetermined condition. For example, the image quality inspecting unit 171 can determine whether or not the focus of the second image 402 satisfies the predetermined condition. The image quality inspecting unit 171 can determine whether or not the blur of the second image 402 satisfies the predetermined condition. The image quality inspecting unit 171 can determine whether or not the brightness of the second image 402 satisfies the predetermined condition. The image quality inspecting unit 171 can determine whether or not a face exists in the second image 402. The image quality inspecting unit 171 can determine whether or not an iris exists in the second image 402. As a result of the determination, if the quality of the second image 402 fails to satisfy the predetermined condition, the image quality inspecting unit 171 can provide the user with the guidance in order to meet the predetermined condition. For the guidance, the text information or signs set forth above can be displayed on the display 150 or the audio information thereof can be output through the speaker 160. In addition, as a result of the determination, if the quality of the second image 402 fails to satisfy the predetermined condition, the image quality inspecting unit 171 can perform the image quality inspection on the basis of the second image of the next frame. For example, the electronic device 100 can photograph the iris images at a predetermined time interval to thereby obtain at least one of the first image frames, and can inspect the quality of at least one of the second image frames related to the first image frames. If the image quality of the second image frame does not satisfy the predetermined condition at a specific time, the electronic device 100 can inspect the quality of the second image of the next standby frame. According to various embodiments of the present disclosure, as a result of the determination of the second image quality inspection, if the quality of the second image 402 satisfies the predetermined condition, the iris recognition unit 172 can receive the first image 401 from the buffer 113 to thereby perform the iris recognition. The first image input into the iris recognition unit 172 can be the first image related to the second image that satisfies the predetermined condition, among a plurality of images stored in the buffer.

Figure 5A:
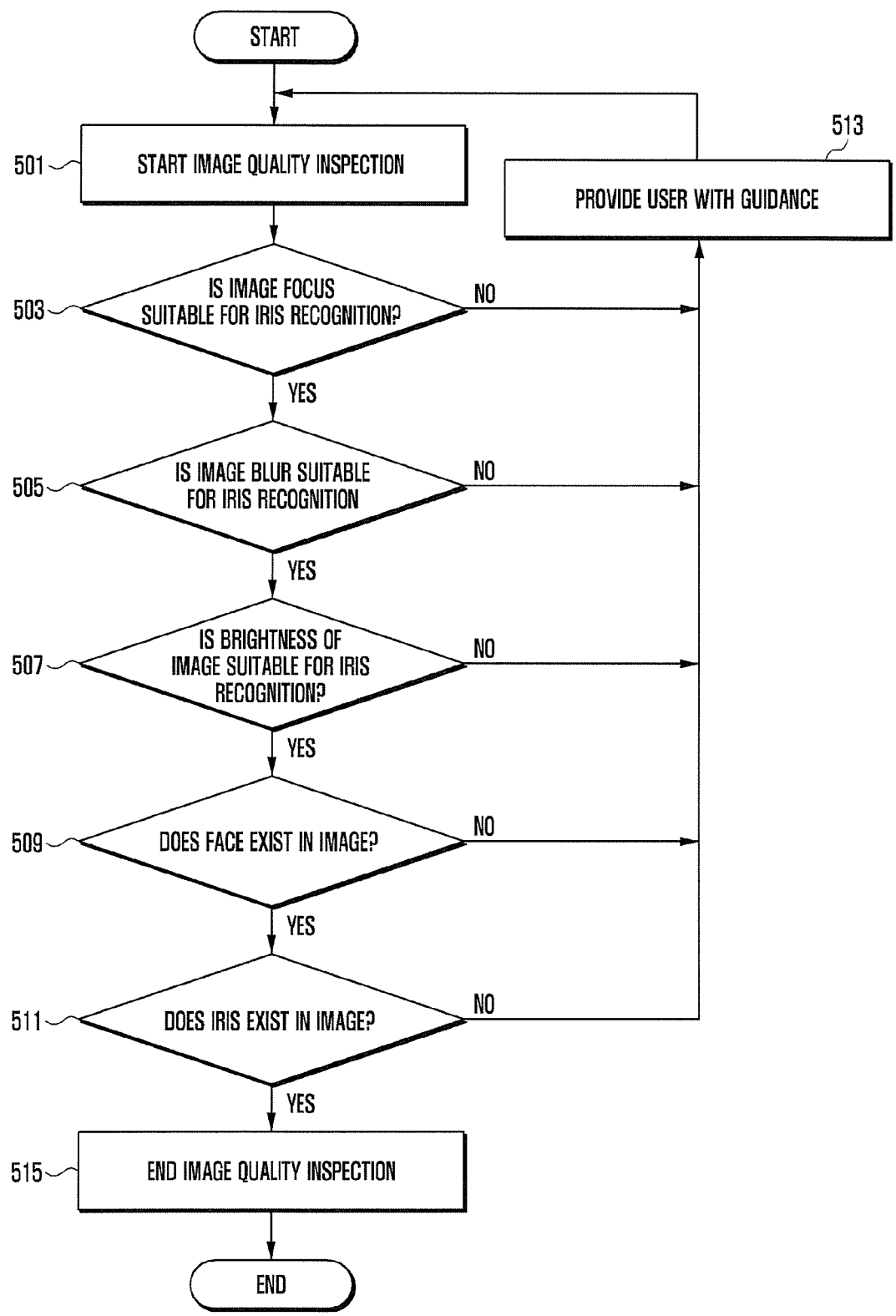
FIG. 5A is a flowchart illustrating the operation in which an image quality inspecting unit determines whether or not the image quality satisfies a predetermined condition, according to various embodiments of the present disclosure.

FIG. 5A is a flowchart illustrating the operation in which an image quality inspecting unit 171 determines whether or not the image quality satisfies a predetermined condition, according to various embodiments of the present disclosure.

In operation 501, the image quality inspecting unit 171 can execute a quality inspection function of the second image. More specifically, the image quality inspecting unit 171 can determine whether or not the quality of the second image satisfies a predetermined condition. The items of the image quality inspection can include at least one of the focal accuracy, the degree of the blur, the brightness, the presence of a face, or the presence of an iris of the second image.

The image quality inspecting unit 171, in operation 503, can determine whether or not the focus of the second image is suitable for the iris recognition. If the focus of the second image does not satisfy the predetermined condition, that is, if the second image is not suitable for the iris recognition, the image quality inspecting unit 171 can provide the user with the guidance in order for the user to create an image suitable for the iris recognition in operation 513. For example, if the focal accuracy of the second image is not within a predetermined focal range, the image quality inspecting unit 171 can display the text information "Please let your eyes focus on the camera" or an arrow sign for the accurate focus on the display 150, or can output the audio information thereof through the speaker 160.

In operation 505, the image quality inspecting unit 171 can determine whether or not the blur of the second image is suitable for performing the iris recognition. If the blur of the second image does not satisfy the predetermined condition, that is, if the second image is not suitable for the iris recognition, the image quality inspecting unit 171 can provide the user with the guidance in order for the user to create an image suitable for the iris recognition in operation 513. For example, if the degree of the blur of the second image is not within a predetermined blur range, the image quality inspecting unit 171 can display the text information "Image is quite blurred. Please remain motionless for photographing" on the display 150, or can output the audio information thereof through the speaker 160.

In operation 507, the image quality inspecting unit 171 can determine whether or not the brightness of the second image is suitable for performing the iris recognition. If the brightness of the second image does not satisfy the predetermined condition, that is, if the second image is not suitable for the iris recognition, the image quality inspecting unit 171 can provide the user with the guidance in order for the user to create an image suitable for the iris recognition in operation 513. For example, if the brightness of the second image is not within a predetermined brightness range, the image quality inspecting unit 171 can display the text information "Please adjust the brightness up," or "Please adjust the brightness down" on the display 150, or can output the audio information thereof through the speaker 160.

In operation 509, the image quality inspecting unit 171 can determine whether or not a face exists in the second image. If no face exists in the second image, that is, if the second image is not suitable for the iris recognition, the image quality inspecting unit 171 can provide the user with the guidance in order for the user to create an image suitable for the iris recognition in operation 513. For example, if it is impossible to obtain the edge information on the face for the iris recognition from the second image, the image quality inspecting unit 171 can display the text information "No face is found" on the display 150, or can output the audio information thereof through the speaker 160.

In operation 511, the image quality inspecting unit 171 can determine whether or not an iris exists in the second image. If no iris exists in the second image, that is, if the second image is not suitable for the iris recognition, the image quality inspecting unit 171 can provide the user with the guidance in order for the user to create an image suitable for the iris recognition in operation 513. If it is impossible to obtain the edge information on the iris for the iris recognition from the second image, the image quality inspecting unit 171 can display the text information "No iris is found" on the display 150, or can output the audio information thereof through the speaker 160. According to various embodiments of the present disclosure, the operations 503 to 511 can be conducted in the order set forth above, but may not be limited thereto. For example, operation 505 can be performed first, and operation 509 can be conducted after operation 503.

If the second image satisfies all of the above conditions and passes the image quality inspection for the iris recognition, the image quality inspecting unit 171 can output the second image to the iris recognition unit 172 in operation 515.

Figure 5B:
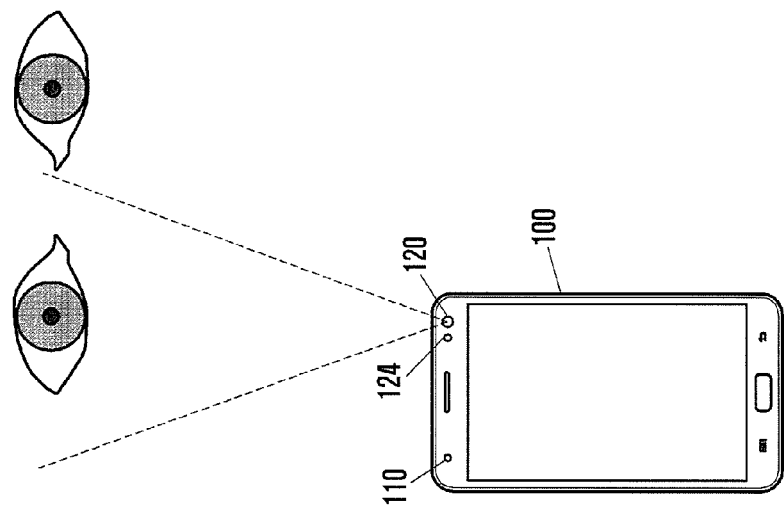
FIGS. 5B and 5C illustrate examples in which an electronic device performs the image quality inspection according to various embodiments of the present disclosure.
Figure 5B:
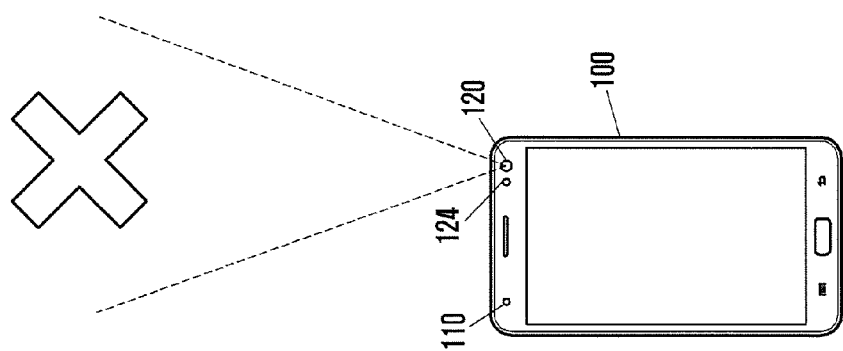
Figure 5C:
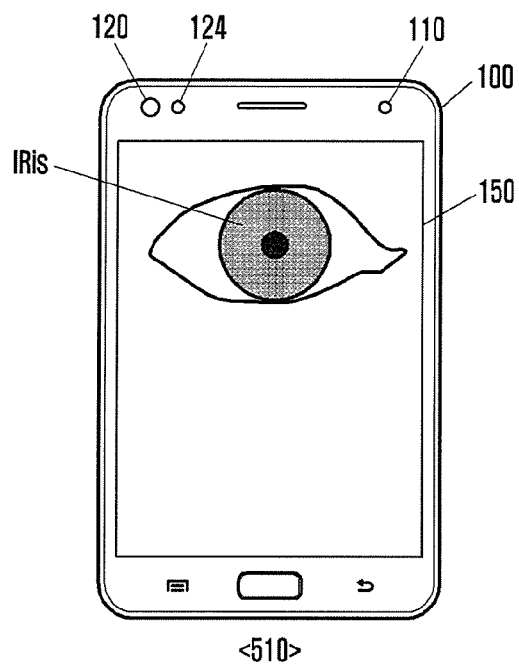
Figure 5C:
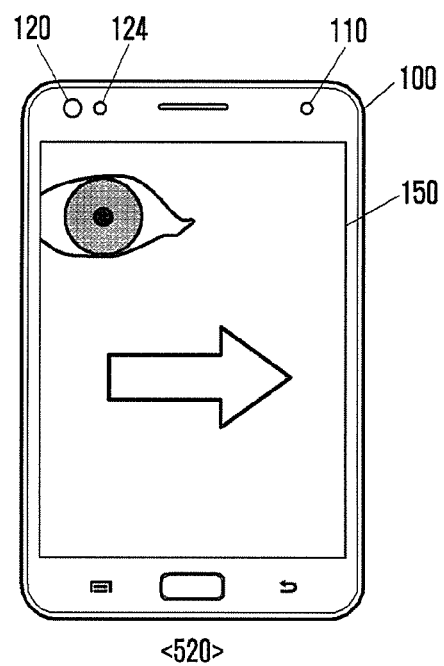
Figure 5C:
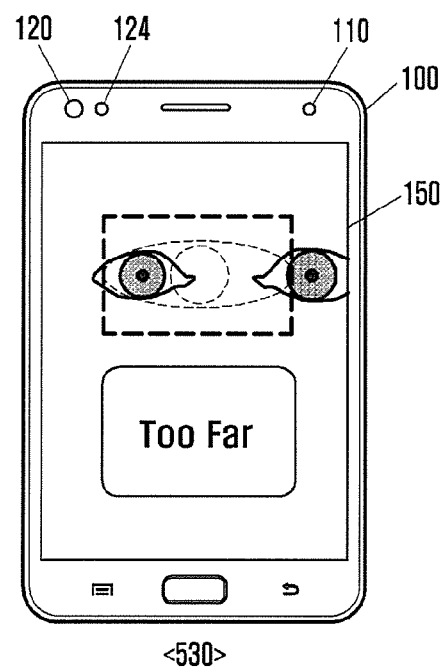
Figure 5C:
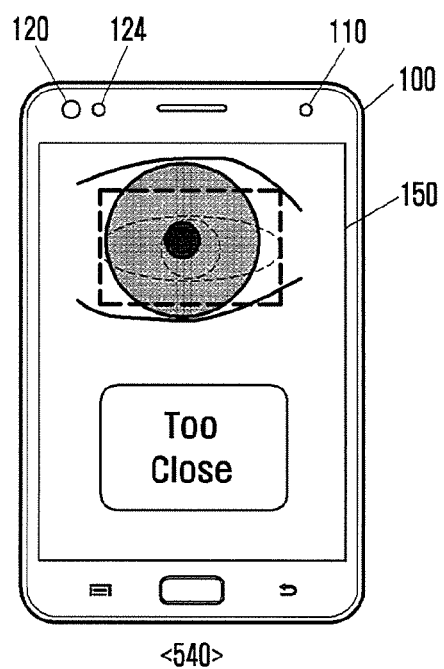

FIGS. 5B and 5C illustrate an example in which the electronic device 100 performs the image quality inspection, according to various embodiments of the present disclosure.

Referring to FIG. 5B, the electronic device 100 can determine whether or not the iris image of the user exists in the second image. As a result of the determination, if it is determined that no iris image exists in the second image, the electronic device 100 may not perform the iris recognition.

In addition, in the case of performing the iris recognition using the infrared ray, the electronic device can reduce the emission amount of the infrared ray in the image quality inspection process. At this time, if no iris image of the user is detected in the second image, the electronic device can inspect the second image of the next frame while maintaining the low amount of the infrared ray. If the iris image of the user is detected in the second image, in order to increase the accuracy of the iris recognition, the electronic device can increase the emission amount of the infrared ray to obtain the iris image of the user (e.g., the first image of the present disclosure) and perform the iris recognition on the basis of the corresponding image. According to this, the power consumption due to the continuous light-emission can be reduced, and the amount of the infrared light incident on the eyes for a unit time can be minimized to thereby secure the eye safety.

Referring to diagram 520 of FIG. 5C, if the iris image of the user in the second image obtained through the camera module 110 is not suitable to perform the iris recognition, the electronic device 100 can provide the user with the guidance in order to relocate the user's iris to an area where the iris can be recognized. In the case of obtaining the first image from the image sensing unit 111, when the user photographs an object through the camera module 110, some camera lenses display that the resolution of an object located in the peripheral portion of the lens is lower than the resolution of an object located in the central portion of the lens. Since the electronic device 100 may not obtain enough resolution for the iris recognition when the user's iris is located in the peripheral portion of the lens, the electronic device 100 can provide the guidance that induces the user to move the iris to the center of the lens where a high-resolution image can be obtained. If it is determined that the user's iris is located in the peripheral portion of the lens in the image quality inspection process, the electronic device can display a sign to guide the position of the user's iris on the display 150, as shown in diagram 520, to thereby guide the user's iris to the central portion of the lens without performing the iris recognition. As shown in diagram 510, if the user's iris is positioned in the central portion of the lens, the electronic device 100 can display the user's iris image in the center of the display 150. The electronic device 100 can perform the image quality inspection using the iris image of the user in the state of diagram 510, and if the iris image passes the image quality inspection, the electronic device 100 can perform the iris recognition.

According to various embodiments of the present disclosure, since the infrared emitting diode 124, which emits a continuous wave infrared ray, can worsen the eye safety, the infrared emitting diode 124 can emit a short pulse infrared light, and the electronic device 100 can perform the iris recognition using the same. In addition, in the case where the electronic device 100 uses the image sensor in a rolling shutter type, if the infrared light emitting time is shorter than the exposure time of the image, the image of which the central portion is bright can be obtained when synchronizing the infrared light emission with the frame of the image sensing unit 111. Since the iris recognition is easy when performed in the bright area, if it is determined that the user's iris is located in the upper portion or the lower portion of the center of the lens in the image quality inspection process, the electronic device 100 can provide the guidance for guiding the user's iris to the center of the lens without performing the iris recognition. When the user positions the iris in the area where the iris recognition is easy pursuant to the guidance, the electronic device 100 can perform the iris recognition.

According to various embodiments of the present disclosure, as shown in diagrams 530 and 540, if the user's iris is too close to or too far away from the lens of the camera that is set to have a specific focus, the depth of the lens may not include the user's iris. At this time, the image that is not included in the depth can have a low resolution, so the image may not be suitable for the iris recognition. Therefore, the electronic device 100 can provide the user with the guidance in order to let the user's iris be included in the depth of the lens by which the iris recognition is easy during the image quality inspection process.

Although the present disclosure has been described with an exemplary embodiment, various changes and suggested to one skilled in the art. It is intended that the present disclosure encompass such changes and modifications as fall within the scope of the appended claims.

What is claimed is:
1. An electronic device comprising:
    sensor configured to obtain a plurality of first images;
    a memory; and
    at least one processor, functionally connected to the sensor and the memory, configured to:
        process at least one of the plurality of first images to create a second image;
        perform image quality inspection based on the second image; and
        perform, if the image quality of the second image satisfies a predetermined condition, iris recognition based on the at least one of the plurality of first images,
    wherein the at least one of the plurality of first images is a high resolution image and the second image is a low resolution image created based on the at least one of the plurality of first images.

2. The electronic device of claim 1, wherein the processor is configured to scale the at least one of the plurality of first images in order to create the second image.

3. The electronic device of claim 2, wherein the processor is configured to adjust a size of the at least one of the plurality of first images or a number of pixels of the at least one of the plurality of first images in order to create the second image.

4. The electronic device of claim 1, wherein the processor is configured to determine whether or not at least one of a focal accuracy, a degree of image blur, a brightness, a presence of a face, or a presence of an iris of the second image satisfies the predetermined condition.

5. The electronic device of claim 1, wherein the processor is configured to, if the image quality of the second image does not satisfy the predetermined condition, perform the image quality inspection on a next frame image of the second image.

6. The electronic device of claim 1, wherein the processor is configured to, if the image quality of the second image does not satisfy the predetermined condition, provide a user of the electronic device with a guidance using at least one of text information or audio information.

7. The electronic device of claim 1, further comprising a buffer configured to store the obtained plurality of first images.

8. The electronic device of claim 1, further comprising a display configured to display the created second image.

9. The electronic device of claim 1, wherein the sensor obtains the plurality of first images through an infrared sensor.

10. A method for recognizing an iris in an electronic device, the method comprising:
- obtaining a plurality of first images through a sensor;
- processing at least one of the plurality of first images to create a second image;
- performing image quality inspection based on the second image; and
- performing, if the image quality of the second image satisfies a predetermined condition, iris recognition based on the at least one of the plurality of first images,
- wherein the at least one of the plurality of first images is a high resolution image and the second image is a low resolution image created based on the at least one of the plurality of first images.

11. The method of claim 10, wherein processing the at least one of the plurality of first images comprises scaling the at least one of the plurality of first images.

12. The method of claim 11, wherein scaling the at least one of the plurality of first images comprises adjusting a size of the at least one of the plurality of first images or a number of pixels of the at least one of the plurality of first images in order to create the second image.

13. The method of claim 10, wherein performing the image quality inspection comprises determining whether or not at least one of a focal accuracy, a degree of image blur, a brightness, a presence of a face, or a presence of an iris of the second image satisfies the predetermined condition.

14. The method of claim 10, further comprising, if an image quality of the second image does not satisfy the predetermined condition, performing the image quality inspection on a next frame image of the second image.

15. The method of claim 10, further comprising, if the image quality of the second image does not satisfy the predetermined condition, providing a user of the electronic device with a guidance by using at least one of text information or audio information.

16. The method of claim 10, further comprising storing the obtained plurality of first images in a buffer.

17. The method of claim 10, further comprising displaying the created second image on a display.

18. The method of claim 10, wherein obtaining the plurality of first images comprises using an infrared sensor.

19. A method for recognizing an iris in an electronic device, the method comprising:
- obtaining a plurality of first images through a sensor;
- processing at least one of the plurality of first images to create a second image;
- performing image quality inspection based on the second image; and
- performing, if the image quality of the second image satisfies a predetermined condition, iris recognition based on a third image obtained through the sensor,
- wherein the at least one of the plurality of first images and the third image are a high resolution image and the second image is a low resolution image created based on the at least one of the plurality first images.

20. The electronic device of claim 1, wherein the processor is configured to:
- obtain a third image through the sensor;
- perform the iris recognition based on the obtained the third image,
- wherein the third image is a high resolution image.

* * * * *